US006347122B1

(12) United States Patent
Chen et al.

(10) Patent No.: US 6,347,122 B1
(45) Date of Patent: Feb. 12, 2002

(54) OPTIMAL COMPLEMENT PUNCTURED CONVOLUTIONAL CODES FOR USE IN DIGITAL AUDIO BROADCASTING AND OTHER APPLICATIONS

(75) Inventors: Brian Chen, Somerville, MA (US); Carl-Erik Wilhelm Sundberg, Chatham, NJ (US)

(73) Assignee: Agere Systems Guardian Corp., Orlando, FL (US)

( * ) Notice: Subject to any disclaimer, the term of this patent is extended or adjusted under 35 U.S.C. 154(b) by 0 days.

(21) Appl. No.: 09/006,570

(22) Filed: Jan. 13, 1998

(51) Int. Cl.[7] ................................................. H04L 5/12

(52) U.S. Cl. ........................ 375/262; 375/219; 375/265; 375/270; 375/296

(58) Field of Search ................................ 375/262, 340, 375/265, 270, 296, 216; 371/43.1; 714/786, 774, 755, 790, 792

(56) References Cited

U.S. PATENT DOCUMENTS

| | | | | |
|---|---|---|---|---|
| 5,844,922 A | * | 12/1998 | Wolf et al. | 371/43.1 |
| 5,909,454 A | * | 6/1999 | Schmidt | 371/43.1 |
| 5,910,182 A | * | 6/1999 | Dent et al. | 714/786 |
| 5,949,796 A | * | 9/1999 | Kumar | 370/529 |
| 6,005,894 A | * | 12/1999 | Kumar | 375/270 |

OTHER PUBLICATIONS

1. B.W. Kroeger and A.J. Vigil, "Improved IBOC DAB Technology for AM and FM Broadcasting," SBE Engineering Conference, pp. 1–10, 1996.
2. B.W. Kroeger and D. Cammarata, "Robust Modem and Coding Techniques for FM Hybrid IBOC DAB," IEEE Transactions on Broadcasting, vol. 43, No. 4, pp. 412–420, Dec. 1997.
3. B.W. Kroeger and P.J. Peyla, "Compatibility of FM Hybrid In–Band On–Channel (IBOC) System for Digital Audio Broadcast," IEEE Transactions on Broadcasting, vol. 43, No. 4, pp. 421–430, Dec. 1997.
4. Y. Yasuda, K. Kashiki and Y. Hirata, "High–rate punctured convolutional codes for soft decision Viterbi decoding," IEEE Transactions on Communications, vol. 32, Mar. 1984.
5. S. Kallel, "Complementary Punctured Convolutional Codes and Their Applications," IEEE Transactions on Communications, vol. 43, No. 6, pp. 2005–2009, Jun. 1995.
6. J. Hagenauer et al., "The Performance of Rate–Compatible Punctured Convolutional Codes for Digital Mobile Radio," IEEE Transactions on Communications, vol. 38, No. 7, pp. 966–980, Jul. 1990.

(List continued on next page.)

*Primary Examiner*—Stephen Chin
*Assistant Examiner*—Shuwang Liu
(74) *Attorney, Agent, or Firm*—Ryan, Mason & Lewis, LLP

(57) ABSTRACT

The invention provides optimal complementary punctured convolutional codes for coding information bits in a communication system. In an illustrative embodiment, an optimal pair of complementary punctured codes is selected from a set of potential code pairs. The set of potential code pairs includes all non-catastrophic complementary punctured code pairs which combine to produce to a specified full-bandwidth code, and thus includes both equivalent and non-equivalent complementary codes. The optimal code pair may be selected, for example, as the pair of equivalent or non-equivalent codes which has the best free Hamming distance and minimum information error weight of all the pairs in the set. In addition, the invention provides both rate-compatible and rate-incompatible codes suitable for use in providing unequal error protection (UEP) for different classes of information bits. The invention further provides optimal bit assignment techniques for use in digital audio broadcasting or other applications in which digital information is transmitted on subcarriers in both an upper and a lower sideband of an analog carrier.

45 Claims, 3 Drawing Sheets

| $G2_2$ | $G1_0$ | $G1_3$ | $G0_1$ | $G0_2$ |
|---|---|---|---|---|

LOWER SIDEBAND

| $G0_0$ | $G0_3$ | $G1_1$ | $G1_2$ | $G2_0$ |
|---|---|---|---|---|

UPPER SIDEBAND

OTHER PUBLICATIONS

7. J. Hagenauer, "Rate Compatible Punctured Convolutional Codes (RCPC Codes) and their Applications," IEEE Transactions on Communications, vol. 36, No. 4, pp. 389–400, Apr. 1988.

8. R.V. Cox et al., "Sub–band Speech Coding and Matched Convolutional Channel Coding for Mobile Radio Channels," IEEE Transactions on Acoustics, Speech and Signal Processing, vol. 39, No. 8, pp. 1717–1731, Aug. 1991.

9. A.R. Calderbank and N. Seshadri, "Multilevel Codes for Unequal Error Protection," IEEE Transactions on Information Theory, vol. 39, No. 4, pp. 1234–1248, Jul. 1993.

* cited by examiner

LOWER SIDEBAND

UPPER SIDEBAND

OPTIMAL COMPLEMENT PUNCTURED CONVOLUTIONAL CODES FOR USE IN DIGITAL AUDIO BROADCASTING AND OTHER APPLICATIONS

FIELD OF THE INVENTION

The present invention relates generally to convolutional codes for use in communication systems, and more particularly to punctured convolutional codes optimized for use in conjunction with digital audio broadcasting and other types of communication system applications which utilize diversity in frequency, time, space, polarization or other system parameters.

BACKGROUND OF THE INVENTION

FIG. 1 shows a portion of a frequency spectrum in an exemplary In Band On Channel (IBOC) system for implementing digital audio broadcasting (DAB) in existing analog frequency modulation (FM) radio bands. In this IBOC system, an analog FM carrier signal 10 serves as a "host" for transmission of digital audio information of CD-like quality. The same digital audio information is transmitted on both a lower sideband 12 and an upper sideband 14 of the analog host 10, using a multicarrier OFDM technique. This ensures that all of the digital information can be recovered when one of the sidebands is corrupted, or even completely lost, due to effects such as fading or interference in the crowded analog FM band. The digital audio subcarriers transmitted in region B of the lower and upper sidebands 12, 14 are generally less susceptible to interference from adjacent FM channels or the analog host 10 than the carriers in regions A or C. The subcarriers in region A of sidebands 12, 14 are more susceptible to adjacent channel interference, while those in region C are more susceptible to interference from the analog host 10. The transmission in region C may make use of precancellation techniques which allow the interference with the analog host 10 to be canceled. Additional details regarding this exemplary IBOC system can be found in B. W. Kroeger and A. J. Vigil, "Improved IBOC DAB Technology for AM and FM Broadcasting," SBE Engineering Conference, pp. 1–10, 1996.

It has been proposed that complementary convolutional codes be utilized for channel coding in DAB systems such as the IBOC system described in conjunction with FIG. 1. For example, a pair of complementary codes can be used individually on both sides of the analog host 10 in the system of FIG. 1. A pair of complementary codes can be generating by "puncturing" a low-rate "mother" code to twice its original rate. Puncturing a mother code is a well-known technique for obtaining high-rate convolutional codes which exhibit good performance and which can be decoded using the same basic Viterbi algorithm that is used for the mother code. See, for example, G. C. Clark, Jr. and J. B. Cain, "Error Correcting Codes for Digital Communications," Plenum Press, 1981, S. Lin and D. J. Costello Jr., "Error Control Coding: Fundamentals and Applications," Prentice-Hall, 1983 and Y. Yasuda, K. Kashiki and Y. Hirata, "High-rate punctured convolutional codes for soft decision Viterbi decoding," IEEE Transactions on Communications, Vol. 32, March 1984.

Puncturing generally involves removing bits from the low-rate mother code such that the remaining code bits form one of the complementary codes, while the punctured bits form the other complementary code of the code pair. The resulting pair of codes, which are referred to as complementary punctured-pair convolutional (CPPC) codes, are complementary in the sense that they are both of a rate which is twice that of the mother code obtained by combining the two codes. Increased puncturing leads to higher punctured code rates. It can be shown that punctured codes of a certain rate generally provide performance which is almost as good as that of optimal codes at the same rate. Unfortunately, the conventional CPPC codes which have been proposed for use in the IBOC system described in the above-cited B. W. Kroeger and A. J. Vigil reference generally do not provide optimal or near-optimal performance, and in some cases are even catastrophic. This may be due in part to a perceived requirement that the code pairs be so-called "equivalent" codes, as defined in S. Kallel, "Complementary Punctured Convolutional Codes and Their Applications," IEEE Transactions on Communications, Vol. 43, No. 6, pp. 2005–2009, June 1995, which is incorporated by reference herein. However, this perceived requirement has had the effect of unduly restricting the scope of search for CPPC codes. A need therefore exists for improved punctured convolutional codes which can provide better performance than conventional codes in the above-described IBOC digital audio broadcasting system and other applications.

SUMMARY OF THE INVENTION

The invention provides optimal punctured convolutional codes for use in digital audio broadcasting as well as other types of communication systems. Optimal punctured convolutional codes are provided for equal error protection (EEP) applications, and both rate-compatible and rate-incompatible codes for are provided for unequal error protection (UEP) applications. In an exemplary embodiment, an optimal code is selected as a code which has the best free Hamming distance and the minimum information error weight from among a set of potential non-catastrophic codes for a given set of operating parameters. Unlike conventional punctured code sets used for digital audio broadcasting applications, a set of potential non-catastrophic codes in accordance with the invention can include codes which are not equivalent in terms of their distance or performance properties. The selected optimal code thus provides performance advantages relative to a code selected from a set restricted to only equivalent codes. Although particularly well suited for use with complementary code pairs, the techniques of the invention can be readily extended for use in selecting an optimal group of n complementary codes from a set of such groups.

The invention may be implemented in an exemplary system in which digital audio information is transmitted on subcarriers in both an upper and a lower sideband of an analog carrier. In such a system, an optimal complementary code pair is selected from a set of code pairs defined in the manner described above. The complementary codes in the selected code pair may each be, for example, a rate-4/5 half-bandwidth convolutional code which is generated by puncturing a rate-2/5 full-bandwidth convolutional code. The full-bandwidth code may itself be generated by puncturing a rate-1/3 mother code. The invention also provides an optimal bit assignment strategy for use in such a system. In accordance with this strategy, bits from a designated code generator may be assigned to the upper and lower sideband subcarriers which are located furthest from the analog carrier. These and other techniques of the invention can be readily extended to a wide variety of different types of communication systems. For example, the invention can be implemented in communication system applications which utilize diversity in frequency, time, space, polarization or any other system parameter.

DETAILED DESCRIPTION OF THE INVENTION

The invention will be described below in conjunction with exemplary complementary punctured convolutional codes optimized for use in a particular digital audio broadcast system. It should be understood, however, that the coding techniques of the invention may be applied to many other types of communication systems. For example, although the digital audio broadcast system described herein utilizes a frequency diversity technique, the invention could also be implemented in systems which utilize time diversity, space diversity, polarization diversity, as well as other types of diversity techniques. The description of the exemplary embodiments will use the term "optimal" to refer to a code which has the best free Hamming distance and the minimum information error weight from among a set of potential non-catastrophic codes for a given set of operating parameters. A code is considered "catastrophic" if its state diagram contains a loop of zero weight other than the self-loop around the zero state. The concepts of free Hamming distance, information error weight and non-catastrophic codes are described in greater detail in, for example, S. Lin and D. J. Costello Jr., "Error Control Coding: Fundamentals and Applications," Prentice-Hall, 1983, and G. C. Clark, Jr. and J. B. Cain, "Error Correcting Codes for Digital Communications," Plenum Press, 1981, which are incorporated by reference herein. Complementary codes in a given pair or other group of codes are considered "equivalent" if their puncturing patterns are cyclic permutations of one another, as described in S. Kallel, "Complementary Punctured Convolutional Codes and Their Applications," IEEE Transactions on Communications, Vol. 43, No. 6, pp. 2005–2009, June 1995. Optimal codes in accordance with the invention may be equivalent or non-equivalent.

Figure 2:
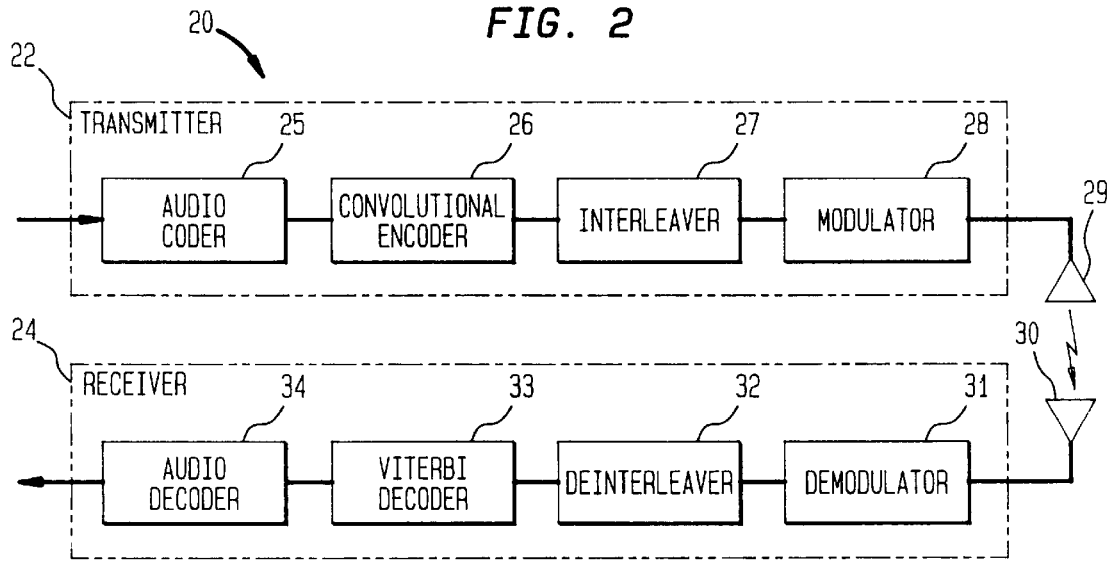
FIG. 2 is a block diagram of a communication system which may be configured to utilize complementary punctured convolutional codes in accordance with the invention.

FIG. 2 is a block diagram of an exemplary communication system 20 in which CPPC codes in accordance with the invention may be utilized. The system 20 includes a transmitter 22 and a receiver 24. The transmitter 22 includes an audio coder 25 for generating a digital bit stream from an analog audio signal. The digital bit stream from audio coder 25 is applied to a convolutional encoder 26 which utilizes CPPC codes, which will be described in greater detail below, to encode the bit stream into a sequence of symbols. Although this embodiment uses a bit stream generated from audio data, the invention is more generally applicable to bits generated by any type of digital source. The sequence of symbols from convolutional encoder 26 are interleaved in an interleaver 27, and then applied to a modulator 28. The modulator 28 may perform several stages of modulation such as, for example, modulating the interleaved symbols onto one or more sub-carriers, and then frequency modulating the sub-carriers onto a radio frequency (RF) carrier.

The modulated carrier is transmitted via transmit antenna 29 to the receiver 24. The transmitter 22 may include additional processing elements, such as multiplexers, upconverters and the like, which are not shown in the FIG. 2 embodiment.

The receiver 24 receives the transmitted signal via receive antenna 30, and performs demodulation operations in demodulator 31 to recover the interleaved symbols. The symbols are deinterleaved in a deinterleaver 32, and the resulting symbol sequence is converted to a digital bit stream in decoder 33 using a soft Viterbi decoding process. The digital bit stream is then decoded in audio decoder 34 to reconstruct the original audio signal. Like the transmitter 22, the receiver 24 may include additional processing elements which are not shown in FIG. 2. It should also be noted that various elements of the system 20, such as the interleaver 27 and the deinterleaver 32, may be eliminated in alternative embodiments. Moreover, various elements of the system 20, such as the audio coder 25, convolutional encoder 26, Viterbi decoder 33 and audio decoder 34, may be implemented using portions of an application-specific integrated circuit, microprocessor or any other type of digital data processor. Various aspects of the invention may also be implemented in the form of one or more software programs executed by a central processing unit (CPU) or the like in the digital data processor.

A number of sets of optimal CPPC codes suitable for use in system 20 of FIG. 2 will now be described. It will be assumed for purposes of illustration that the operating parameters of system 20 are similar to those of the IBOC DAB system described in conjunction with FIG. 1 and in the above-cited B. W. Kroeger and A. J. Vigil reference, "Improved IBOC DAB Technology for AM and FM Broadcasting," SBE Engineering Conference, pp. 1–10, 1996. This exemplary IBOC system can be configured to utilize rate-4/5 forward error correction codes for both the upper and lower sideband channels. These rate-4/5 codes are referred to as half-bandwidth codes, and combine to form a rate-2/5 error correction code referred to as a full-bandwidth code. It will be shown below that, utilizing the techniques of the invention, a rate-1/3 mother code can be punctured to meet these exemplary IBOC code requirements.

The rate-1/3 mother code may be a rate-1/3 convolutional code having a constraint length K=7 as described in J. Hagenauer, "Rate-compatible punctured convolutional codes (RCPC codes) and their applications," IEEE Transactions on Communications, Vol. 36, No. 7, pp. 389–400, April 1988. The code rate is the ratio of input bits to output bits for the convolutional encoder. A rate-1/3 encoder generates three output bits for each input bit. A group of three coded output bits is referred to as a symbol. The value of K refers to the number of uncoded input bits which are processed to generate each output symbols. For example, a rate-1/3 convolutional encoder with K=7 generally includes a seven-bit shift register and three modulo-two adders. The inputs of the each of the adders are connected to a different subset of the bits of the shift register. These connections are specified by the "generators" of the encoder. Because a given output symbol in this example is generated using the latest input bit as well as the previous six input bits stored in the shift register, the K=7 encoder is said to have a "memory" of six. The rate-1/3, K=7 code used in this example has the following three generators:

$g_0$=1011011

$g_1$=1111001

$g_2$=1100101

Each of the generators may be viewed as specifying the connections between bits of the seven-bit shift register and inputs of one of the modulo-2 adders. For example, the adder corresponding to generator $g_0$ generates the first bit of each output symbol as the modulo-2 sum of the bits in the first, third, fourth, sixth and seventh bit positions in the shift-register, with the first bit position containing the latest input bit. Similarly, the generators $g_1$ and $g_2$ generate the second and third bits, respectively, of each output symbol as modulo-2 sums of the bits in the positions designated by the respective generator values. The free Hamming distance $d_f$ of the rate-1/3, K=7 code with the above-noted generators is 14, and its information error weight $c_{d_f}/P$ is one. When this code is punctured in a rate-compatible manner to rates of 4/11, 4/10, 4/9 and 1/2, the resulting rate-1/2 code is also the best rate-1/2, K=7 convolutional code.

Two different puncturing patterns were used to obtain the following full-bandwidth codes from the rate-1/3 mother code: (1) a rate-2/5 code as described in the above-cited Hagenauer reference; and (2) a rate-2/5 code as described in B. W. Kroeger and D. Cammarata, "Complementary punctured convolutional codes with application to IBOC DAB," 1997. The puncturing patterns and other properties for these full-bandwidth codes are given by:

Hagenauer Rate-2/5 Code: (1111, 1111, 1100), ($d_f$=11, $c_{d_f}/P$=1).

Kroeger Rate-2/5 Code: (1111, 1111, 1010), ($d_f$=11, $c_{d_f}/P$=2). These codes were then punctured in accordance with the techniques of the invention to form rate-4/5 CPPC codes which are optimal in terms of having maximum worst-case free Hamming distance and minimum worst-case information error weight. These optimal codes are given in TABLES 1 and 2 below.

The optimal CPPC codes are determined in this embodiment by first calculating the pairs of free distances and information error weights of all non-catastrophic complementary codes that combine to one of the two rate-2/5 codes noted above. The worst-case free distance of the complementary pair is the minimum of the pair of free distances. The worst-case information error weight ($c_{worst}$) is the maximum of the pair of information error weights. Among the code pairs that have the maximum worst-case free distance, the pair with the lowest $c_{worst}/P$ value is considered the optimal pair. The free distances and information error weights may be calculated using an augmented-metric Viterbi algorithm. Other optimization criteria may be used in alternative embodiments of the invention.

TABLES 1 and 2 below list the non-catastrophic complementary rate-4/5 codes with puncture period P=4 that have a maximum worst-case free distance, as generated from the rate-2/5 Hagenauer and Kroeger codes, respectively. The codes are listed in order of optimality. It should be noted that the optimum pair listed on the top line of TABLE 2 have puncture patterns which are cyclically-shifted versions of each other and are thus "equivalent" as defined in the above-cited S. Kallel reference. However, it can be seen from the optimum pair of TABLE 1 that optimal CPPC codes in accordance with the invention need not be equivalent.

TABLE 1

Rate-4/5 CPPC codes that combine to Hagenauer rate-2/5 code, with P = 4.

| Puncture Pattern | $d_f$ | $c_{d_f}/P$ | Complementary Pattern | $d_f$ | $c_{d_f}/P$ |
|---|---|---|---|---|---|
| (1011, 0100, 1000) | 4 | 8.00 | (0100, 1011, 0100) | 4 | 2.75 |
| (1000, 0011, 1100) | 4 | 9.50 | (0111, 1100, 0000) | 4 | 6.25 |
| (1011, 0100, 0100) | 4 | 21.25 | (0100, 1011, 1000) | 4 | 9.75 |

TABLE 2

Rate-4/5 CPPC codes that combine to Kroeger rate-2/5 code, with P = 4.

| Puncture Pattern | $d_f$ | $c_{d_f}/P$ | Complementary Pattern | $d_f$ | $c_{d_f}/P$ |
|---|---|---|---|---|---|
| (0110, 1001, 0010) | 4 | 2.50 | (1001, 0110, 1000) | 4 | 2.50 |
| (0110, 1001, 1000) | 4 | 12.00 | (1001, 0110, 0010) | 4 | 12.00 |

Figure 1:
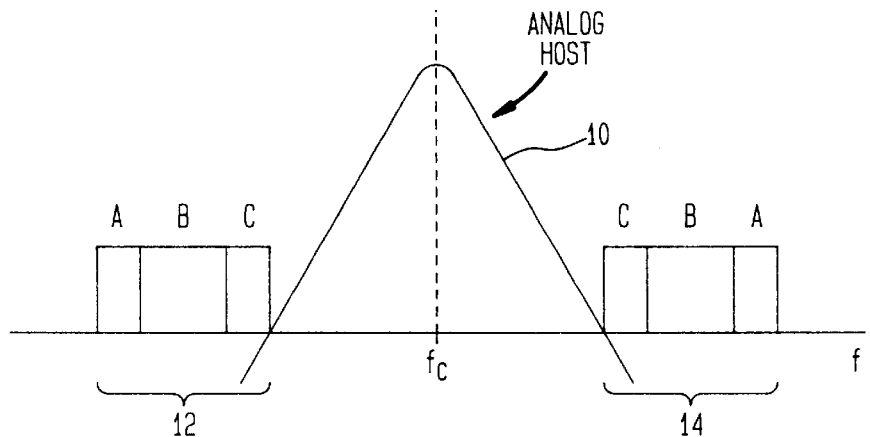
FIG. 1 shows a portion of a frequency spectrum in a conventional In Band On Channel (IBOC) digital audio broadcasting system.

As noted above, the IBOC system described in conjunction with FIG. 1 utilizes a multicarrier modulation technique, with varying amounts of interference susceptibility on the different digital audio subcarriers in portions A, B and C of the upper and lower sidebands. More particularly, the subcarriers farthest away from the analog host are most susceptible to interference. Thus, the mapping of code bits to subcarrier frequencies can affect performance. The invention provides a mapping of code bits to subcarriers which improves performance relative to conventional mappings. This mapping is determined by puncturing each sideband of the full-bandwidth codes in an RCPC fashion while keeping all of the bits in the other sideband. For example, assume that the two complementary codes from the top line of TABLE 2 are the respective lower sideband and upper sideband half-bandwidth codes. Since the outermost subcarriers on each sideband are most susceptible to interference, the bits from the third generator $g_2$ are mapped to these frequencies. Thus, if both outer regions A in the upper and lower sidebands of FIG. 1 are corrupted or lost, the remaining code would be an industry-standard rate-1/2 code. At each puncturing step, the punctured bit is assigned to the outermost unassigned subcarrier. The optimal puncture patterns for the lower sideband (LSB) and upper sideband (USB) are shown in TABLES 3 and 4, respectively.

TABLE 3

Lower Sideband Puncture Pattern for Bit Assignment

| LSB Pattern | Full Pattern | Full Rate | $d_f$ | $C_{d_f}/P$ |
|---|---|---|---|---|
| (0110, 1001, 0000) | (1111, 1111, 1000) | 4/9 | 10 | 1.75 |
| (0110, 0001, 0000) | (1111, 0111, 1000) | 4/8 | 8 | 0.75 |
| (0110, 0000, 0000) | (1111, 0110, 1000) | 4/7 | 7 | 2.00 |
| (0010, 0000, 0000) | (1011, 0110, 1000) | 4/6 | 5 | 0.75 |

Figure 3A:
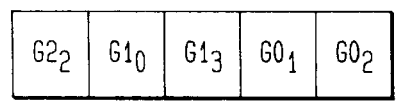
FIGS. 3A and 3B illustrate exemplary bit assignment patterns for use in implementing optimal complementary punctured codes in accordance with the invention.
Figure 3B:
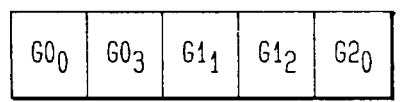

FIGS. 3A and 3B illustrate the above-described optimal bit assignment strategy for the lower sideband and upper sideband, respectively. The notation $G0_i$, $G1_i$, and $G2_i$ refers to the ith bit, modulo 4, from the generators $g_0$, $g_1$ and $g_2$, respectively. The second bit modulo 4 from the third generator $g_2$ is assigned to the outermost subcarrier of the lower sideband, and the zeroth bit modulo 4 from the third generator $g_2$ is assigned to the outermost subcarrier of the upper sideband. This bit assignment optimizes performance in the presence of interference for the exemplary IBOC system of FIG. 1. The bit assignment techniques of the invention could also be used to provide similar improvements in other types of communication systems.

TABLE 4

Upper Sideband Puncture Pattern for Bit Assignment

| USB Pattern | Full Pattern | Full Rate | $d_f$ | $C_{d_f}/P$ |
|---|---|---|---|---|
| (1001, 0110, 0000) | (1111, 1111, 0010) | 4/9 | 10 | 1.75 |
| (1001, 0100, 0000) | (1111, 1101, 0010) | 4/8 | 8 | 0.75 |

TABLE 4-continued

Upper Sideband Puncture Pattern for Bit Assignment

| USB Pattern | Full Pattern | Full Rate | $d_f$ | $C_{d_f}/P$ |
|---|---|---|---|---|
| (1001, 0000, 0000) | (1111, 1001, 0010) | 4/7 | 7 | 2.00 |
| (1000, 0000, 0000) | (1110, 1001, 0010) | 4/6 | 5 | 0.75 |

It has been proposed that DAB broadcasters be allowed the option of transmitting with wider bandwidth codes by adding tones closer to the analog host. In this mode, the full-bandwidth code may be the full, un-punctured, rate-1/3 mother code described above. The half-bandwidth codes, which will be referred to as "half-bandwidth+" codes, will then each have a rate of 2/3. TABLE 5 below gives the optimal code pairs for two different compatibility constraints. The code pair on the top line of TABLE 5 is the best punctured pair overall. The pair on the second line is the best pair that is rate-compatible with the optimal rate-4/5 code pair from TABLE 2. The advantage of this second pair is that if the additional inner tones were erased by the channel or if the receiver were incapable of receiving these inner tones, the remaining codes would be the optimal half-bandwidth tones previously described.

TABLE 5

Optimal Half-Bandwidth + Codes, with P = 4.

| Puncture Pattern | $d_f$ | $c_{d_f}/P$ | Complementary Pattern | $d_f$ | $c_{d_f}/P$ |
|---|---|---|---|---|---|
| (0101, 0101, 1010) | 6 | 3.00 | (1010, 1010, 0101) | 6 | 3.00 |
| (0110, 1001, 0011) | 5 | 0.75 | (1001, 0110, 1100) | 5 | 0.75 |

Another aspect of the invention relates to providing unequal error protection (UEP) in a DAB or other communication system. In order to configure the above-described IBOC system to provide UEP, one would still need an average rate of 2/5 for the fill-bandwidth code and an average rate of 4/5 for the half-bandwidth codes. The invention satisfies this requirement through the use of time multiplexing. The time multiplexing will be illustrated for a case in which two classes of information bits are to be unequally protected. Class I bits are the most important bits and must be protected with a low-rate (i.e., high redundancy) code. Class II bits are the less important class of bits. Generalization to three or more classes of bits is straightforward, and will not be described in detail herein.

The rates for the codes protecting the different classes of bits may be selected to satisfy an average rate constraint such as those noted above for the IBOC system. If the fraction of Class I bits is $f$ and the fraction of Class II bits is $1-f$, the rates of the codes must satisfy:

$$\frac{1}{R} = \frac{f}{R_I} + \frac{1-f}{R_{II}}, \quad (1)$$

where R is the average rate, and $R_I$ and $R_{II}$ are the rates of the codes for the Class I and Class II bits, respectively. For example, with R=2/5 and $f=\frac{1}{2}$, the pair of rates $(R_I, R_{II})=$ (4/11, 4/9) satisfies equation (1) above.

A full-bandwidth code with a set of rates satisfying equation (1) can be constructed by puncturing a common convolutional mother code. Furthermore, if one wants to avoid inserting termination bits between the Class I and Class II bits, the mother code needs to be punctured in a rate-compatible manner, as described in the above-cited J. Hagenauer reference. More particularly, the Class I bits should follow the Class II bits, and the unpunctured bits in the Class II code must be a subset of the unpunctured bits in the Class I code. TABLES 6 and 7 below show candidate punctured convolutional codes for Class I and Class II bits, respectively, in the IBOC system. TABLE 6 shows the puncture patterns, with a puncture period P=8, for all non-equivalent rate-4/11 codes compatible with an industry-standard rate-1/2 code obtained with the puncture pattern (1111, 1111, 1111 1111, 0000 0000). TABLE 7 shows the puncture patterns, with P=8, for all non-equivalent rate-4/9 codes compatible with the industry-standard rate-1/2 code. It should be noted that cyclic shifts of the puncture patterns in TABLES 6 and 7 will provide equivalent performance. The mother code used to generate the punctured codes in TABLES 6 and 7 is the same rate-1/3 convolutional code used in the previously-described equal error protection (EEP) examples. With a pair of rates $(R_I, R_{II})=(4/11, 4/9)$ and equal numbers of Class I and Class II bits, the average rate of the full-bandwidth code is 2/5 and therefore satisfies the rate requirements for the exemplary IBOC system.

TABLE 6

Full-Bandwidth Codes for Protection of Class I Bits in DAB System with UEP

| Puncture Pattern | $d_f$ | $Cd_f/P$ |
|---|---|---|
| (1111 1111, 1111 1111, 1110 1110) | 12 | 0.250 |
| (1111 1111, 1111 1111, 1110 1101) | 12 | 0.250 |
| (1111 1111, 1111 1111, 1111 1100) | 12 | 0.500 |
| (1111 1111, 1111 1111, 1111 1010) | 12 | 0.625 |

TABLE 7

Full-Bandwidth Codes for Protection of Class II Bits in DAB System with UEP

| Puncture Pattern | $d_f$ | $Cd_f/P$ |
|---|---|---|
| (1111 1111, 1111 1111, 1000 1000) | 10 | 1.750 |
| (1111 1111, 1111 1111, 1001 0000) | 10 | 2.500 |
| (1111 1111, 1111 1111, 1100 0000) | 10 | 3.000 |
| (1111 1111, 1111 1111, 1010 0000) | 10 | 3.125 |

Figure 4:
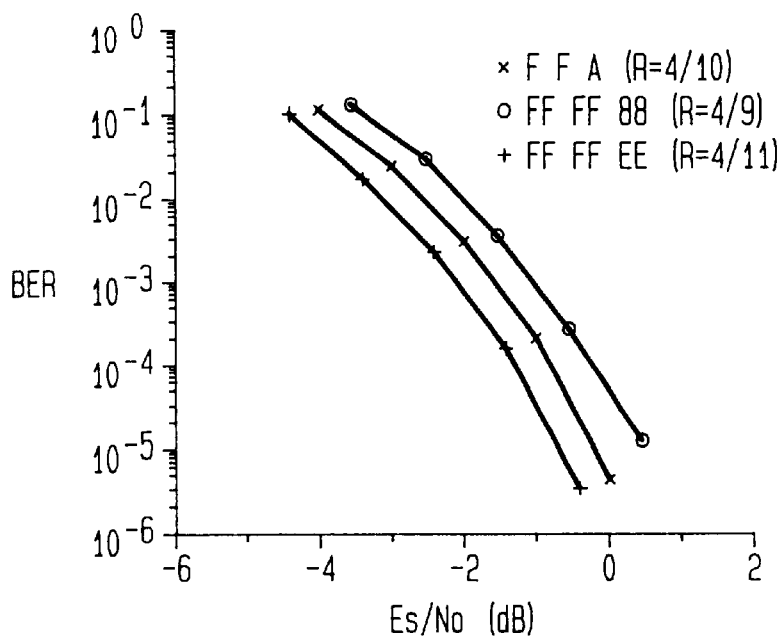
FIGS. 4, 5 and 7 show plots of simulated bit error rate (BER) for a number of different punctured convolutional codes in accordance with the invention.

FIG. 4 shows plots of simulated bit error rate (BER) performance for full-bandwidth EEP and UEP code examples given above. It is assumed for these plots, and the BER plots of FIGS. 5 and 7, that the information source is a sequence of $10^6$ pseudo-randomly generated bits, and the channel is an additive white Gaussian noise (AWGN) channel. The EEP code used in the plots is the above-noted full-bandwidth Kroeger rate-2/5 (i.e., 4/10) code with a puncture pattern of (1111, 1111, 1010), or FFA in hexadecimal notation. The UEP codes are the best full-bandwidth Class I (rate-4/11) and Class II (rate-4/9) codes taken from the top lines of TABLES 6 and 7, respectively. These codes in hexadecimal notation may be written as FF FF EE and FF FF 88, respectively. It can be seen that the rate-4/11 Class I code provides the best BER performance, followed by the rate-2/5 EEP code, with the rate-4/9 Class II code providing the worst BER performance of the three full-bandwidth codes.

As in the EEP examples described previously, half-bandwidth codes for an IBOC system with UEP can be formed by puncturing the full-bandwidth codes given in TABLES 6 and 7. Half of the bits for each of the Class I and Class II full-bandwidth codes may be placed in the upper sideband half-bandwidth codes and the other half may be placed in the lower sideband half-bandwidth codes. Thus, the half-bandwidth code rates are twice the full-bandwidth code rates, so if the full-bandwidth code rates satisfy rate equation (1) above, the half-bandwidth code rates will also satisfy equation (1). In order to avoid inserting termination bits between the Class II bits and the Class I bits, the half-bandwidth codes and full-bandwidth codes should both be rate compatible.

TABLE 8 below shows the optimal half-bandwidth codes for UEP with a puncture period P=8. These codes correspond to the best full-bandwidth codes in TABLES 6 and 7. It can be seen from TABLE 6 that there are two equally good (i.e., same free Hamming distance $d_f$ and information error weight $c_{d_f}/P$ values) rate-4/11 full-bandwidth codes, as shown on the first two lines of TABLE 6. The best complementary pairs corresponding to these full-bandwidth codes are shown in the first two lines of TABLE 8. The complementary pairs on the first two lines of TABLE 8 thus combine to form the optimal Class I full-bandwidth codes (1111 1111, 1111 1111, 1110 1110) and (1111 1111, 1111 1111, 1110 1101) from the first two lines of TABLE 6. It can be seen from TABLE 7 that there is only one optimal rate-4/9 code, shown on the first line of TABLE 7, and the corresponding optimal complementary pair is shown on the third line of TABLE 8. The complementary pair on the third line of TABLE 8 thus combine to form the optimal Class II full-bandwidth code (1111 1111, 1111 1111, 1000 1000) on the first line of TABLE 7.

TABLE 8

Optimal Half-Bandwidth Complementary Code Pairs for UEP.

| Puncture Pattern | $d_f$ | $Cd_f/P$ | Complementary Pattern | $d_f$ | $Cd_f/P$ |
|---|---|---|---|---|---|
| (0000 0110, 1101 0101, 0110 1010) | 5 | 7.125 | (1111 1001, 0010 1010, 1000 0100) | 5 | 7.000 |
| (0011 1011, 1100 0100, 1000 1001) | 5 | 9.500 | (1100 0100, 0011 1011, 0110 0100) | 5 | 8.750 |
| (0011 1100, 1100 0011, 0000 1000) | 3 | 2.000 | (1100 0011, 0011 1100, 1000 0000) | 3 | 2.000 |

Figure 5:
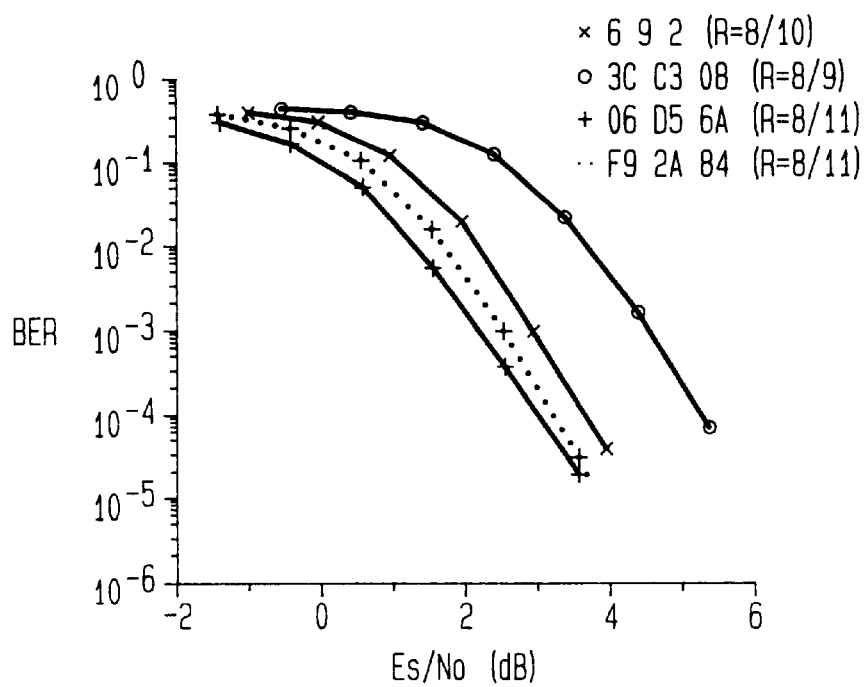

FIG. 5 shows plots of simulated BER performance for half-bandwidth EEP and UEP complementary code examples given above. The EEP code pair used in the plots is the half-bandwidth rate-4/5 (i.e., 8/10) code pair from the top line of TABLE 2. The codes of this code pair are equivalent, and therefore only one BER curve is plotted for this code pair. The EEP code for which the BER curve is plotted is (0110, 1001, 0010), or 692 in hexadecimal notation. The UEP codes are the best half-bandwidth Class I (rate-8/11) and Class II (rate-8/9) codes taken from the first and third lines, respectively, of TABLE 8. The codes of the Class II code pair are also equivalent, and therefore only one BER curve is plotted for the Class II pair. This code is (0011 1100, 1100 0011, 0000 1000) or 3C C3 08 in hexadecimal notation. The complementary half-bandwidth Class I codes in hexadecimal notation may be written as 06 D5 6A and F9 2A 84. It can be seen that the rate-8/11 Class II complementary codes provides the best BER performance, followed by the rate-8/10 EEP code, with the rate-8/9 Class II code providing the worst BER performance of the exemplary codes plotted in FIG. 5.

Figure 6:
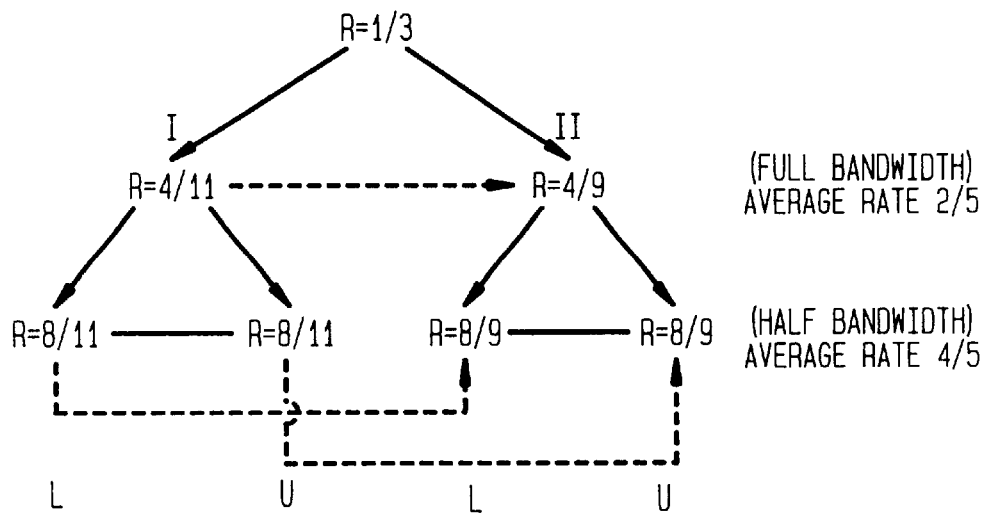
FIG. 6 shows rate-compatibility relationships for an IBOC system configured with unequal error protection (UEP) in accordance with the invention.

As noted previously, rate-compatibility constraints may be applied in order to avoid inserting extra termination bits between the Class II and Class I information bits in a UEP application. FIG. 6 illustrates an exemplary set of rate-compatibility constraints. The top line of the diagram in FIG. 6 represents the rate-1/3 mother code. In general, a code at the tail end of a given arrow in FIG. 6 can be punctured to yield the code at the head of that arrow. The middle line of the diagram shows the full-bandwidth Class I (rate-4/11) and Class II (rate-4/9) codes generated by puncturing the rate-1/3 mother code, with the Class I code on the left and the Class II code on the right. The average rate of these Class I and Class II codes is 2/5. The bottom line of the diagram shows the half-bandwidth codes generated by puncturing the full-bandwidth codes of the middle line. The lower sideband code is shown to the left of the corresponding full-bandwidth code, and the upper sideband code is shown to the right of the full-bandwidth code. The average rate of the half-bandwidth codes is 4/5. The dashed arrows in FIG. 6 show the rate compatibility required to avoid the need for extra termination bits between the Class II and Class I codes. Codes connected by lines instead of arrows are complementary codes.

TABLE 9 below shows an exemplary set of fully-compatible codes satisfying the compatibility relationships set forth in FIG. 6. Only the rate-8/11 complementary code pair is sub-optimal. The rate-4/11 code is equivalent to the rate-4/11 code on the top line of TABLE 6. The complementary rate-8/11 codes in TABLE 9 are equivalent. Both have a free distance $d_f$ of 5 and an information error weight $c_{d_f}/P$ of 12.25.

TABLE 9

Fully-Compatible UEP Code Set.

| Puncture Pattern | Rate | Complementary Pattern | Rate |
|---|---|---|---|
| (1111 1111, 1111 1111, 1011 1011) | 4/11 | N/A | — |
| (1111 1111, 1111 1111, 1000 1000) | 4/9 | N/A | — |
| (0011 1100, 1100 0011, 0010 1001) | 8/11 | (1100 0011, 0011 1100, 1001 0010) | 8/11 |
| (0011 1100, 1100 0011, 0000 1000) | 8/9 | (1100 0011, 0011 1100, 1000 0000) | 8/9 |

Figure 7:
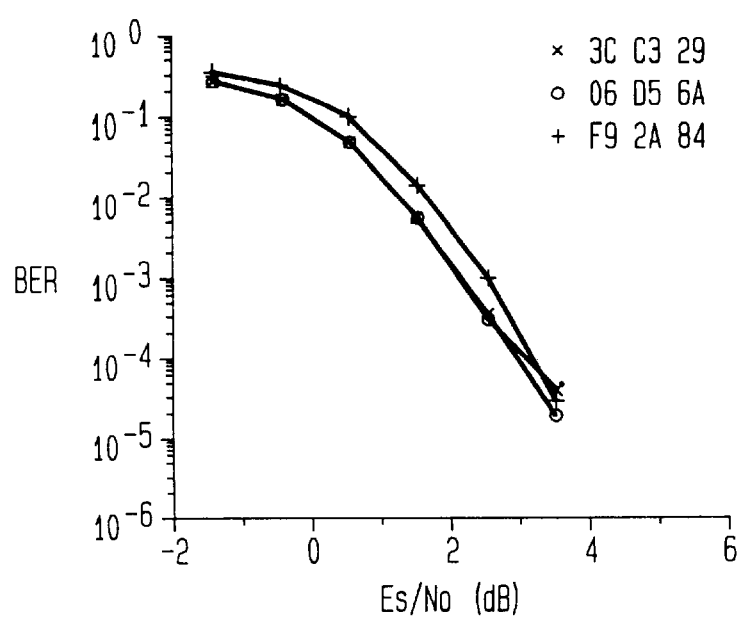

FIG. 7 shows plots of simulated BER performance for one of the codes in the equivalent pair of fully-compatible rate-8/11 complementary codes from TABLE 9, along with the best (but not fully-compatible) rate-8/11 code pair from the top line of TABLE 8. The code from the pair of fully-compatible rate-8/11 codes is expressed in hexadecimal notation as 3C C3 29. The codes of the best rate-8/11 code pair from TABLE 8 are expressed in hexadecimal notation as 06 DS 6A and F9 2A 84. It can be seen from the BER plots for these three codes in FIG. 7 that the performance penalty associated with the use of the sub-optimal but fully-compatible rate-8/11 code pair is only approximately 0.4 dB.

The above-described embodiments of the invention are intended to be illustrative only. For example, alternative embodiments of the invention may utilize code rates and code memories other than those described, and other distance or performance based metrics to determine code optimality. In addition, the techniques of the invention may be applied to other types of DAB systems, as well as to other types of non-DAB communication systems. Moreover, although illustrated for two-fold diversity based on pairs of complementary codes, the invention can be generalized in a straightforward manner to three-fold diversity based on complementary punctured triplet codes and n-fold diversity based on punctured codes with an n-fold increase in rate. These and numerous other alternative embodiments and implementations within the scope of the following claims will be apparent to those skilled in the art.

What is claimed is:

1. A method of coding information bits in a communication system, the method comprising the steps of:
receiving a stream of information bits; and
coding the information bits to generate a sequence of symbols, wherein the information bits are coded using a group of n complementary punctured convolutional codes, the group of n complementary punctured convolutional codes being selected by: (i) computing pairs of free distances and information error weights for each group in a set of groups of non-catastrophic complementary codes, at least one of the groups including complementary codes which are not cyclic permutations of one another, wherein the worst-case free distance of a given group of complementary codes is the minimum of the free distances of the codes in that group, and the worst-case information error weight is the maximum of the information error weights of the codes in that group: and (ii) selecting the group of complementary codes from the set of groups by selecting, from among the code groups that have a maximum worst-case free distance, the code group with the lowest worst-case information error weight.

2. The method of claim 1 wherein the selected group of complementary codes has the best free Hamming distance and minimum information error weight of the groups in the set of groups of complementary codes.

3. The method of claim 1 wherein the selected group of complementary codes are generated by puncturing a rate-1/3, K=7 convolutional mother code with generators given by $g_0 1011011$, $g_1=1111001$ and $g_2=1100101$, where K denotes a constraint length of the code.

4. The method of claim 1 wherein n=2 such that the group of complementary punctured convolutional codes used to encode the information bits is a pair of complementary punctured convolutional codes.

5. The method of claim 4 wherein the system transmits digital information on subcarriers in both an upper and a lower sideband of an analog carrier, and the complementary codes in the selected code pair are each rate-4/5 half-bandwidth convolutional codes generated by puncturing a rate-2/5 full-bandwidth convolutional code which is in turn generated by puncturing a rate-1/3 mother code.

6. The method of claim 5 wherein the half-bandwidth codes are generated from the full-bandwidth code using a puncture pattern selected from a set including at least the following puncture patterns: (1011, 0100, 1000), (1000, 0011, 1100), (1011, 0100, 0100), (0110, 1001, 0010) and (0110, 1001, 1000).

7. The method of claim 4 wherein the system transmits digital information on subcarriers in both an upper and a lower sideband of an analog carrier, and the complementary codes in the selected code pair are each rate-2/3 half-bandwidth convolutional codes generated by puncturing a rate-1/3 full-bandwidth code.

8. The method of claim 7 wherein the half-bandwidth codes are generated from the full-bandwidth code using a puncture pattern selected from a set including at least the following puncture patterns: (0101, 0101, 1010) and (0110, 1001, 0011).

9. The method of claim 1 wherein the system transmits digital information on subcarriers in both an upper and a lower sideband of an analog carrier, and the method further includes the step of assigning particular bits from a particular generator of the convolutional codes to the upper and lower sideband subcarriers which are located furthest from the analog carrier, wherein the particular bits assigned to the lower sideband subcarrier located furthest from the analog carrier are associated with a second bit from a third generator $g_2$, and the particular bits assigned to the upper sideband subcarrier located furthest from the analog carrier are associated with a zeroth bit from the third generator $g_2$.

10. The method of claim 1 wherein the information bits include at least a first class of bits to be encoded at a first rate $R_I$ and a second class of bits to be encoded at a rate $R_{II}$, where $R_{II}$ is greater than $R_I$.

11. The method of claim 10 wherein if the fraction of the information bits in the first class bits is $f$ and the fraction of the information bits in the second class is $1-f$, the rates $R_I$ and $R_{II}$ satisfy the following equation:

$$\frac{1}{R} = \frac{f}{R_I} + \frac{1-f}{R_{II}},$$

in which R is the average rate of the selected group of convolutional codes.

12. The method of claim 10 wherein a full-bandwidth code used for the first class of bits is generated from a mother code using a puncture pattern selected from a set including at least the following puncture patterns: (1111 1111, 1111 1111, 1110 1110), (1111 1111, 1111 1111, 1110 1101), (1111 1111, 1111 1111, 1111 1100) and (1111 1111, 1111 1111, 1111 1010).

13. The method of claim 10 wherein a full-bandwidth code used for the second class of bits is generated from a mother code using a puncture pattern selected from a set including at least the following puncture patterns: (1111 1111, 1111 1111, 1000 1000), (1111 1111, 1111 1111, 1001 0000),(1111 1111, 1111 1111, 1100 0000)and(1111 1111, 1111 1111, 1010 0000).

14. The method of claim 10 wherein the group of convolutional codes includes a pair of half-bandwidth codes for encoding the first class of bits and a pair of half-bandwidth codes for encoding the second class of bits, wherein each of the pairs of half-bandwidth codes are generated by puncturing a corresponding full-bandwidth code.

15. The method of claim 14 wherein the system transmits digital information on subcarriers in both an upper and a lower sideband of an analog carrier, and wherein one of the half-bandwidth codes for each of the first and second classes of bits is utilized in the lower sideband, and the other half-bandwidth code for each of the first and second classes is utilized in the upper sideband.

16. The method of claim 10 wherein the codes used for to encode the first and second classes of bits are rate compatible.

17. The method of claim 10 wherein additional termination bits are inserted between bits of the second class and bits of the first class.

18. The method of claim 14 wherein the half-bandwidth codes of the first and second classes are generated from the corresponding full-bandwidth codes using a puncture pattern selected from a set including at least the following puncture patterns: (0000 0110, 1101 0101, 0110 1010), (0011 1011, 1100 0100, 1000 1001) and (0011 1100, 1100 0011, 0000 1000).

19. The method of claim 14 wherein the full-bandwidth codes for the first and second classes are generated from a mother code using the rate-compatible puncture patterns (1111 1111, 1111 1111, 1011 1011) and (1111 1111, 1111 1111, 1000 1000), and the half-bandwidth codes for the first and second classes are generated from the full-bandwidth codes using the rate-compatible puncture patterns (0011 1100, 1100 0011, 0010 1001) and (0011 1100, 1100 0011, 0000 1000).

20. An apparatus for use in coding information bits in a communication system, the apparatus comprising:
  a convolutional encoder which receives a stream of information bits and generates a sequence of symbols therefrom;
   wherein the encoder is operative to encode the information bits using a group of n complementary punctured convolutional codes, the group of n complementary punctured convolutional codes being selected by: (i) computing pairs of free distances and information error weights for each group in a set of groups of non-catastrophic complementary codes, at least one of the groups including complementary codes which are not cyclic permutations of one another, wherein the worst-case free distance of a given group of complementary codes is the minimum of the free distances of the codes in that group, and the worst-case information error weight is the maximum of the information error weights of the codes in that group; and (ii) selecting the group of complementary codes from the set of groups by selecting, from among the code groups that have a maximum worst-case free distance, the code group with the lowest worst-case information error weight.

21. The apparatus of claim 20 wherein the selected group of complementary codes has the best free Hamming distance and minimum information error weight of the groups in the set of groups of complementary codes.

22. The apparatus of claim 20 wherein the selected group of complementary codes are generated by puncturing a rate-1/3, K=7 convolutional mother code with generators given by $g_0$=1011011, $g_1$=1111001 and $g_2$=1100101, where K denotes a constraint length of the code.

23. The apparatus of claim 20 wherein n=2 such that the group of complementary punctured convolutional codes used to encode the information bits is a pair of complementary punctured convolutional codes.

24. The apparatus of claim 23 wherein the system transmits digital information on subcarriers in both an upper and a lower sideband of an analog carrier, and the complementary codes in the selected code pair are each rate-4/5 half-bandwidth convolutional codes generated by puncturing a rate-2/5 full-bandwidth convolutional code which is in turn generated by puncturing a rate-1/3 mother code.

25. The apparatus of claim 23 wherein the system transmits digital information on subcarriers in both an upper and a lower sideband of an analog carrier, and the complementary codes in the selected code pair are each rate-2/3 half-bandwidth convolutional codes generated by puncturing a rate-1/3 full-bandwidth convolutional code.

26. The apparatus of claim 20 wherein the system transmits digital information on subcarriers in both an upper and a lower sideband of an analog carrier, and the encoder is further operative to assign particular bits from a particular generator to the upper and lower sideband subcarriers which are located furthest from the analog carrier, wherein the particular bits assigned to the lower sideband subcarrier located furthest from the analog carrier are associated with a second bit from a third generator $g_2$, and the particular bits assigned to the upper sideband subcarrier located furthest from the analog carrier are associated with a zeroth bit from the third generator $g_2$.

27. The apparatus of claim 20 wherein the information bits include at least a first class of bits to be encoded at a first rate and a second class of bits to be encoded at a second rate greater than the first rate.

28. The apparatus of claim 27 wherein the group of convolutional codes includes a pair of half-bandwidth codes for encoding the first class of bits and a pair of half-bandwidth codes for encoding the second class of bits, wherein each of the pairs of half-bandwidth codes are generated by puncturing a corresponding full-bandwidth code.

29. The apparatus of claim 28 wherein the system transmits digital information on subcarriers in both an upper and a lower sideband of an analog carrier, and wherein one of the half-bandwidth codes for each of the first and second classes of bits is utilized in the lower sideband, and the other half-bandwidth code for each of the first and second classes is utilized in the upper sideband.

30. A transmitter for use in a communication system, the transmitter comprising:
  a convolutional encoder which receives a stream of information bits and generates a sequence of symbols therefrom, wherein the encoder is operative to encode the information bits using a group of n complementary punctured convolutional codes, the group of n complementary punctured convolutional codes being selected by: (i) computing pairs of free distances and information error weights for each group in a set of groups of non-catastrophic complementary codes, at least one of the groups including complementary codes which are not cyclic permutations of one another, wherein the worst-case free distance of a given group of complementary codes is the minimum of the free distances of the codes in that group, and the worst-case information error weight is the maximum of the information error weights of the codes in that group: and (ii) selecting the group of complementary codes from the set of groups by selecting, from among the code groups that have a maximum worst-case free distance, the code group with the lowest worst-case information error weight; and
  a modulator for modulating the encoded symbols onto at least one carrier signal.

31. A receiver for use in a communication system, the receiver comprising:
  a demodulator for demodulating at least one carrier signal to recover a sequence of symbols; and
  a convolutional decoder which receives the sequence of symbols and generates a stream of information bits therefrom, wherein the decoder is operative to decode the symbols using a group of n complementary punctured convolutional codes, the group of n complementary punctured convolutional codes being selected by: (i) computing pairs of free distances and information error weights for each group in a set of groups of non-catastrophic complementary codes, at least one of the groups including complementary codes which are not cyclic permutations of one another, wherein the worst-case free distance of a given group of complementary codes is the minimum of the free distances of the codes in that group, and the worst-case information error weight is the maximum of the information error weights of the codes in that group; and (ii) selecting the group of complementary codes from the set of groups by selecting, from among the code groups that have a maximum worst-case free distance, the code group with the lowest worst-case information error weight.

32. A method of coding information bits in a communication system, the system transmitting digital information on subcarriers in both an upper and a lower sideband of an analog carrier, the method comprising the steps of:
  receiving a stream of information bits; and coding the information bits to generate a sequence of symbols, wherein the information bits are coded using a group of n complementary punctured convolutional codes generated by puncturing a convolutional mother code having a set of generators including at least three generators $g_0$, $g_1$, and $g_2$, wherein particular bits from a particular generator of the convolutional codes are assigned to the upper and lower sideband subcarriers which are located furthest from the analog carrier, and wherein the particular bits assigned to the lower sideband subcarrier located furthest from the analog carrier are associated with a given bit position of the generator $g_2$, and the particular bits assigned to the upper sideband subcarrier located furthest from the analog carrier are associated with another bit position of the generator $g_2$.

33. An apparatus for use in coding information bits in a communication system, the system transmitting digital information on subcarriers in both an upper and a lower sideband of an analog carrier, the apparatus comprising:

a convolutional encoder which receives a stream of information bits and generates a sequence of symbols therefrom;

wherein the encoder is operative to encode the information bits using a group of n complementary punctured convolutional codes generated by puncturing a convolutional mother code having a set of generators including at least three generators $g_0$, $g_1$ and $g_2$, wherein particular bits from a particular one of the generators are assigned to the upper and lower sideband subcarriers which are located furthest from the analog carrier, and wherein the particular bits assigned to the lower sideband subcarrier located furthest from the analog carrier are associated with a given bit position of the generator $g_2$, and the particular bits assigned to the upper sideband subcarrier located furthest from the analog carrier are associated with another bit position of the generator $g_2$.

34. A method of coding information bits in a communication system, the system transmitting digital information on subcarriers in both an upper and a lower sideband of an analog carrier, the method comprising the steps of:

receiving a stream of information bits; and coding the information bits to generate a sequence of symbols, wherein the information bits are coded using a pair of complementary punctured convolutional codes, and the complementary codes in the code pair are each rate-4/5 half-bandwidth convolutional codes generated by puncturing a rate-2/5 full-bandwidth convolutional code which is in turn generated by puncturing a rate-1/3 mother code, and further wherein the half-bandwidth codes are generated from the full-bandwidth code using a puncture pattern selected from a set including at least the following puncture patterns: (1011, 0100, 1000), (1000, 0011, 1100), (1011, 0100, 0100), (0110, 1001, 0010) and (0110, 1001, 1000).

35. An apparatus for use in coding information bits in a communication system, the system transmitting digital information on subcarriers in both an upper and a lower sideband of an analog carrier, the apparatus comprising:

a convolutional encoder which receives a stream of information bits and generates a sequence of symbols therefrom;

wherein the encoder is operative to encode the information bits using a pair of complementary punctured convolutional codes, and the complementary codes in the code pair are each rate-4/5 half-bandwidth convolutional codes generated by puncturing a rate-2/5 full-bandwidth convolutional code which is in turn generated by puncturing a rate-1/3 mother code, and further wherein the half-bandwidth codes are generated from the full-bandwidth code using a puncture pattern selected from a set including at least the following puncture patterns: (1011, 0100, 1000), (1000, 0011, 1100), (1011, 0100, 0100), (0110, 1001, 0010) and (0110, 1001, 1000).

36. A method of coding information bits in a communication system, the system transmitting digital information on subcarriers in both an upper and a lower sideband of an analog carrier, the method comprising the steps of:

receiving a stream of information bits; and coding the information bits to generate a sequence of symbols, wherein the information bits are coded using a pair of complementary punctured convolutional codes, and the complementary codes in the code pair are each rate-2/3 half-bandwidth convolutional codes generated by puncturing a rate-1/3 full-bandwidth code, and wherein the half-bandwidth codes are generated from the full-bandwidth code using a puncture pattern selected from a set including at least the following puncture patterns: (0101, 0101, 1010) and (0110, 1001, 0011).

37. An apparatus for use in coding information bits in a communication system, the system transmitting digital information on subcarriers in both an upper and a lower sideband of an analog carrier, the apparatus comprising:

a convolutional encoder which receives a stream of information bits and generates a sequence of symbols therefrom;

wherein the encoder is operative to encode the information bits using a pair of complementary punctured convolutional codes, and the complementary codes in the code pair are each rate-2/3 half-bandwidth convolutional codes generated by puncturing a rate-1/3 full-bandwidth code, and wherein the half-bandwidth codes are generated from the full-bandwidth code using a puncture pattern selected from a set including at least the following puncture patterns: (0101, 0101, 1010) and (0110, 1001, 0011).

38. A method of coding information bits in a communication system, the method comprising the steps of:

receiving a stream of information bits; and coding the information bits to generate a sequence of symbols, wherein the information bits are coded using a group of n complementary punctured convolutional codes, and wherein the information bits include at least a first class of bits to be encoded at a first rate and a second class of bits to be encoded at a second rate greater than the first rate, and further wherein a full-bandwidth code used for the first class of bits is generated from a mother code using a puncture pattern selected from a set including at least the following puncture patterns: (1111 1111, 1111 1111, 1110 1110), (1111 1111, 1111 1111, 1110 1101), (1111 1111, 1111 1111, 1111 1100) and (1111 1111, 1111 1111, 1111 1010).

39. An apparatus for use in coding information bits in a communication system, the apparatus comprising:

a convolutional encoder which receives a stream of information bits and generates a sequence of symbols therefrom;

wherein the encoder is operative to encode the information bits using a group of n complementary punctured convolutional codes, and further wherein the information bits include at least a first class of bits to be encoded at a first rate and a second class of bits to be encoded at a second rate greater than the first rate, and further wherein a full-bandwidth code used for the first class of bits is generated from a mother code using a puncture pattern selected from a set including at least the following puncture patterns: (1111 1111, 1111 1111, 1110 1110), (1111 1111, 1111 1111, 1110 1101), (1111 1111, 1111 1111, 1111 1100) and (1111 1111, 1111 1111, 1111 1010).

40. A method of coding information bits in a communication system, the method comprising the steps of:

receiving a stream of information bits; and coding the information bits to generate a sequence of symbols, wherein the information bits are coded using a group of n complementary punctured convolutional codes, and wherein the information bits include at least a first class of bits to be encoded at a first rate and a second class of bits to be encoded at a second rate greater than the first rate, and further wherein a full-bandwidth code used for the second class of bits is generated from a mother code using a puncture pattern selected from a set including at least the following puncture patterns: (1111 1111, 1111 1111, 1000 1000), (1111 1111, 1111 1111, 1001 0000),(1111 1111, 1111 1111, 1100 0000) and (1111 1111, 1111 1111, 1010 0000).

41. An apparatus for use in coding information bits in a communication system, the apparatus comprising:

a convolutional encoder which receives a stream of information bits and generates a sequence of symbols therefrom;

wherein the encoder is operative to encode the information bits using a group of n complementary punctured convolutional codes, and wherein the information bits include at least a first class of bits to be encoded at a first rate and a second class of bits to be encoded at a second rate greater than the first rate, and further wherein a full-bandwidth code used for the second class of bits is generated from a mother code using a puncture pattern selected from a set including at least the following puncture patterns: (1111 1111, 1111 1111, 1000 1000), (1111 1111, 1111 1111, 1001 0000),(1111 1111, 1111 1111, 1100 0000)and(1111 1111, 1111 1111, 1010 0000).

42. A method of coding information bits in a communication system, the system transmitting digital information on subcarriers in both an upper and a lower sideband of an analog carrier, the method comprising the steps of:

receiving a stream of information bits; and coding the information bits to generate a sequence of symbols, wherein the information bits include at least a first class of bits to be encoded at a first rate and a second class of bits to be encoded at a second rate greater than the first rate, and wherein the information bits are coded using a group of complementary punctured convolutional codes including a pair of half-bandwidth codes for encoding the first class of bits and a pair of half-bandwidth codes for encoding the second class of bits, wherein each of the pairs of half-bandwidth codes are generated by puncturing a corresponding full-bandwidth code, and further wherein one of the half-bandwidth codes for each of the first and second classes of bits is utilized in the lower sideband, and the other half-bandwidth code for each of the first and second classes is utilized in the upper sideband, the half-bandwidth codes of the first and second classes being generated from the corresponding full-bandwidth codes using a puncture pattern selected from a set including at least the following puncture patterns: (0000 0110, 1101 0101, 0110 1010), (0011 1011, 1100 0100, 1000 1001) and (0011 1100, 1100 0011, 0000 1000).

43. An apparatus for use in coding information bits in a communication system, the system transmitting digital information on subcarriers in both an upper and a lower sideband of an analog carrier, the apparatus comprising:

a convolutional encoder which receives a stream of information bits and generates a sequence of symbols therefrom;

wherein the encoder is operative to encode the information bits using a group of complementary punctured convolutional codes, the information bits including at least a first class of bits to be encoded at a first rate and a second class of bits to be encoded at a second rate greater than the first rate, the group of complementary punctured convolutional codes including a pair of half-bandwidth codes for encoding the first class of bits and a pair of half-bandwidth codes for encoding the second class of bits, wherein each of the pairs of half-bandwidth codes are generated by puncturing a corresponding full-bandwidth code, and further wherein one of the half-bandwidth codes for each of the first and second classes of bits is utilized in the lower sideband, and the other half-bandwidth code for each of the first and second classes is utilized in the upper sideband, the half-bandwidth codes of the first and second classes being generated from the corresponding full-bandwidth codes using a puncture pattern selected from a set including at least the following puncture patterns: (0000 0110, 1101 0101, 0110 1010), (0011 1011, 1100 0100, 1000 1001) and (0011 1100, 1100 0011, 0000 1000).

44. A method of coding information bits in a communication system, the system transmitting digital information on subcarriers in both an upper and a lower sideband of an analog carrier, the method comprising the steps of:

receiving a stream of information bits; and coding the information bits to generate a sequence of symbols, wherein the information bits include at least a first class of bits to be encoded at a first rate and a second class of bits to be encoded at a second rate greater than the first rate, and wherein the information bits are coded using a group of complementary punctured convolutional codes including a pair of half-bandwidth codes for encoding the first class of bits and a pair of half-bandwidth codes for encoding the second class of bits, wherein each of the pairs of half-bandwidth codes are generated by puncturing a corresponding full-bandwidth code, and further wherein one of the half-bandwidth codes for each of the first and second classes of bits is utilized in the lower sideband, and the other half-bandwidth code for each of the first and second classes is utilized in the upper sideband, the full-bandwidth codes for the first and second classes being generated from a mother code using the rate-compatible puncture patterns (1111 1111, 1111 1111, 1011 1011) and (1111 1111, 1111 1111, 1000 1000), and the half-bandwidth codes for the first and second classes being generated from the full-bandwidth codes using the rate-compatible puncture patterns (0011 1100, 1100 0011, 0010 1001) and (0011 1100, 1100 0011, 0000 1000).

45. An apparatus for use in coding information bits in a communication system, the system transmitting digital information on subcarriers in both an upper and a lower sideband of an analog carrier, the apparatus comprising:

a convolutional encoder which receives a stream of information bits and generates a sequence of symbols therefrom;

wherein the encoder is operative to encode the information bits using a group of complementary punctured convolutional codes, the information bits including at least a first class of bits to be encoded at a first rate and a second class of bits to be encoded at a second rate greater than the first rate, the group of complementary punctured convolutional codes including a pair of half-bandwidth codes for encoding the first class of bits and a pair of half-bandwidth codes for encoding the second class of bits, wherein each of the pairs of half-bandwidth codes are generated by puncturing a corresponding full-bandwidth code, and further wherein one of the half-bandwidth codes for each of the first and second classes of bits is utilized in the lower sideband, and the other half-bandwidth code for each of the first and second classes is utilized in the upper sideband, the full-bandwidth codes for the first and second classes being generated from a mother code using the rate-compatible puncture patterns(1111 1111, 1111 1111, 1011 1011) and (1111 1111, 1111 1111, 1000 1000), and the half-bandwidth codes for the first and second classes being generated from the full-bandwidth codes using the rate-compatible puncture patterns (0011 1100, 1100 0011, 0010 1001) and (0011 1100, 1100 0011, 0000 1000).

\* \* \* \* \*